(12) United States Patent
Ohno

(10) Patent No.: US 7,600,909 B2
(45) Date of Patent: Oct. 13, 2009

(54) SPREAD ILLUMINATING APPARATUS

(75) Inventor: Yasuo Ohno, Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 16 days.

(21) Appl. No.: 11/892,542

(22) Filed: Aug. 23, 2007

(65) Prior Publication Data
US 2008/0084710 A1   Apr. 10, 2008

(30) Foreign Application Priority Data
Oct. 6, 2006   (JP) ............................. 2006-275347

(51) Int. Cl.
F21V 7/04 (2006.01)
(52) U.S. Cl. ................. 362/633; 362/608; 362/612; 362/621; 349/60
(58) Field of Classification Search ............... 362/608, 362/612, 621, 632–634; 349/58, 60, 65, 349/69
See application file for complete search history.

(56) References Cited

U.S. PATENT DOCUMENTS 5,769,521 A * 6/1998 Osawa et al. ................ 362/27

FOREIGN PATENT DOCUMENTS

| JP | A 05-142424 | 6/1993 |
| JP | A 09-050704 | 2/1997 |
| JP | A 09-282919 | 10/1997 |
| JP | A 2000-113709 | 4/2000 |
| JP | A 2002-156632 | 5/2002 |
| JP | A 2003-215546 | 7/2003 |
| JP | A 2003-217326 | 7/2003 |
| JP | A 2004-186004 | 7/2004 |
| JP | A 2004-241282 | 8/2004 |
| JP | A 2004-253317 | 9/2004 |
| JP | A 2005-121829 | 5/2005 |
| JP | A 2006-216244 | 8/2006 |

* cited by examiner

Primary Examiner—Sandra L O'Shea
Assistant Examiner—Jason Moon Han
(74) Attorney, Agent, or Firm—Oliff & Berridge, PLC

(57) ABSTRACT

A spread illuminating apparatus includes: a point light source; a light conductor plate having a prism array formed at a side surface thereof at which the point light source is disposed; a frame which houses the point light source and the light conductor plate and which includes an elastically active area to urge the light conductor plate toward the point light source; and a heat-resistant transparent spacer which is composed of an elastic layer preferably made of heat resistant silicone rubber and a non-elastic layer made of polyethylene terephthalate and which is disposed between the point light source and the prism array of the light conductor plate such that the elastic layer makes contact with the point light source and the non-elastic layer makes contact with the prism array.

8 Claims, 4 Drawing Sheets

F I G. 1
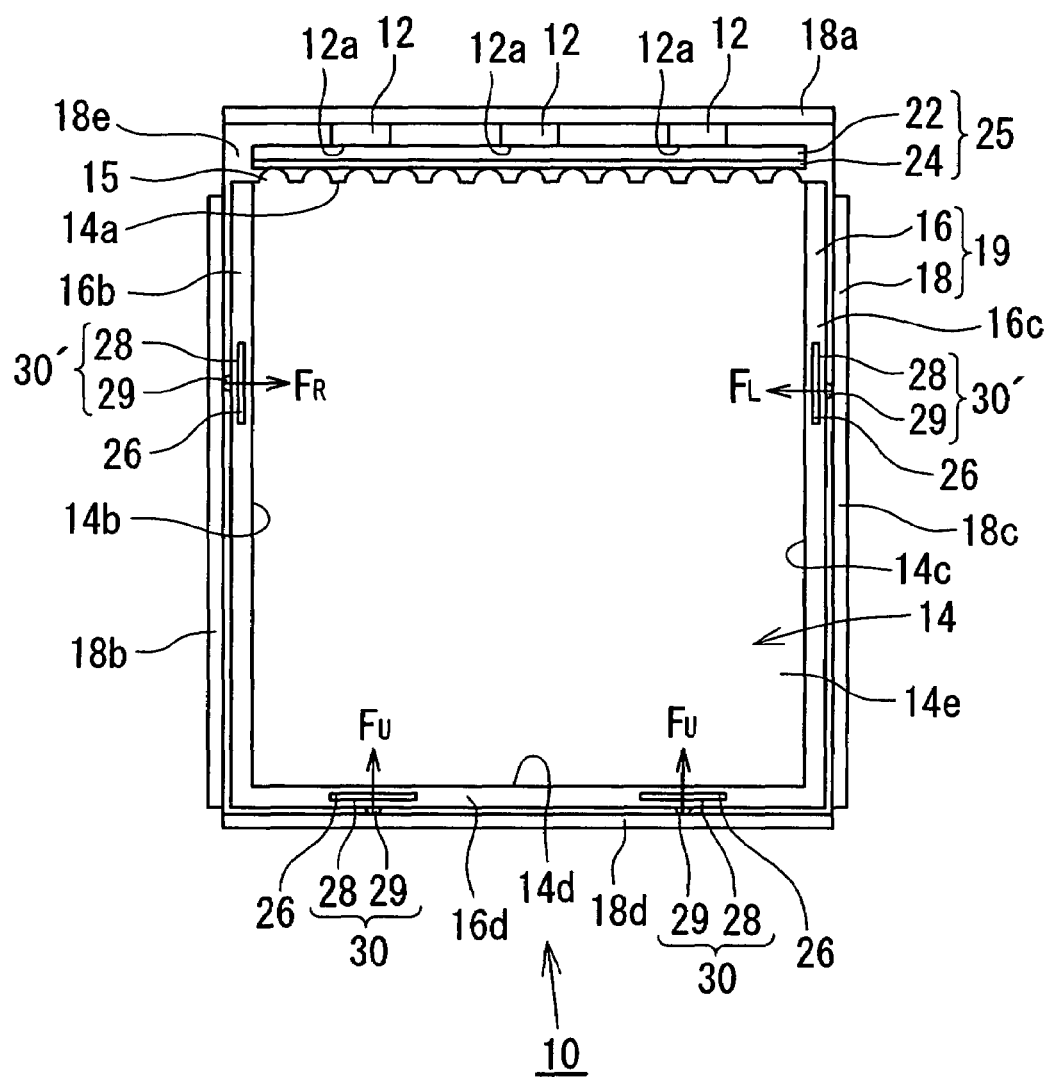

F I G. 2
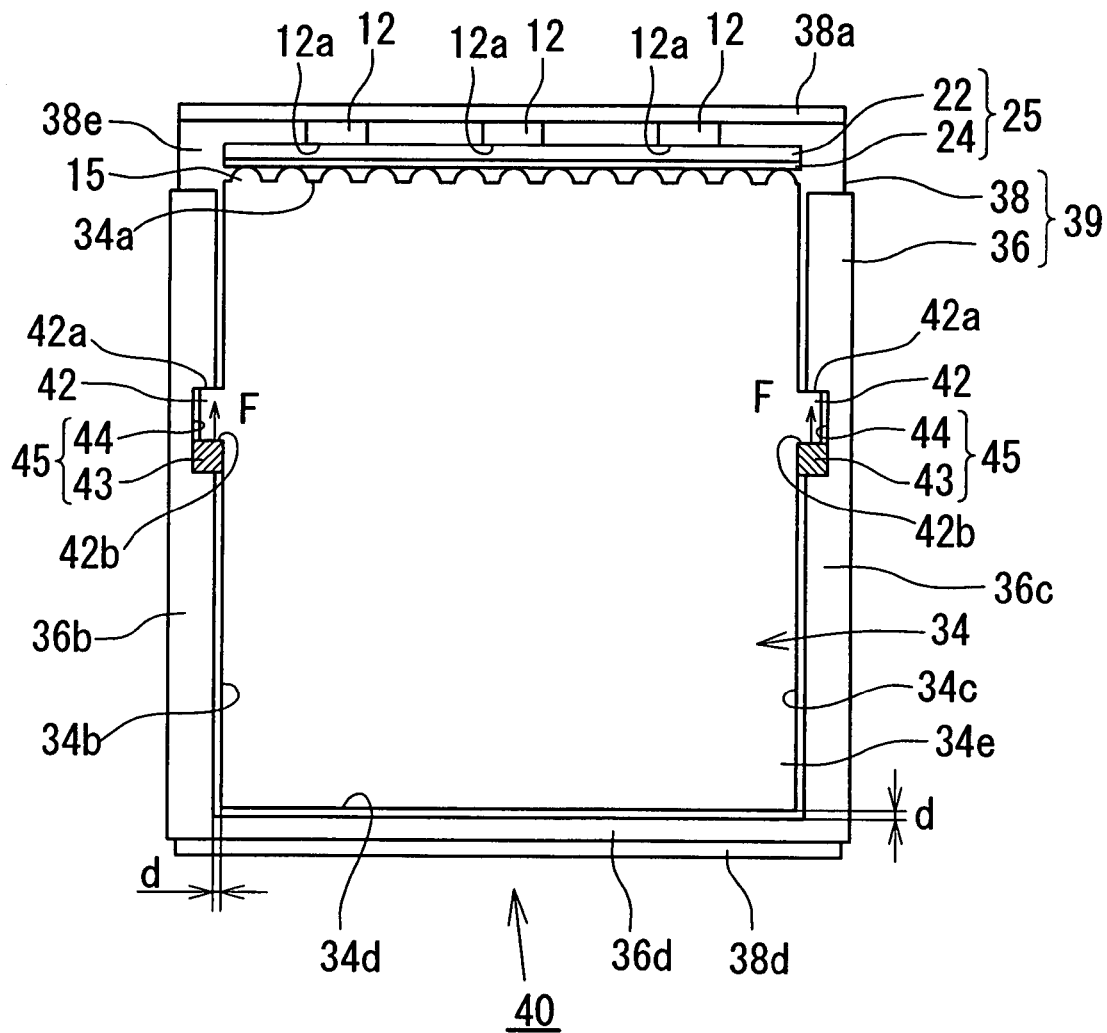

SPREAD ILLUMINATING APPARATUS

BACKGROUND OF THE INVENTION

1. Field of the Invention

The present invention relates to a side light type spread illuminating apparatus, and more particularly to a spread illuminating apparatus for use as a lighting means for a liquid crystal display device.

2. Description of the Related Art

A side light type spread illuminating apparatus, in which a primary light source is disposed at a side surface of a light conductor plate, is predominantly used as a lighting means for a liquid crystal display (LCD) device used in a mobile telephone, and like devices. Conventionally, the primary light source has been constituted by a cold cathode lamp. Currently, a point light source, such as a white light emitting diode (LED), is heavily used, which is easier to handle, enables easier downsizing and is more resistant to impact shock than the cold cathode lamp.

Such a spread illuminating apparatus using a point light source is expanding its application field, and the application is now directed not only to a small LCD device for use in a mobile telephone but also to a relatively large LCD device for use in, for example, a car navigation system. In order to sufficiently illuminate a large display area, various approaches have been attempted to efficiently utilize light emitted from the primary light source and also to increase the amount of light emitted.

One of such approaches is disclosed (refer to, for example, Japanese Patent Application Laid-Open No. 2003-215546: Paragraph [0027] and FIG. 2 therein), in which an LED is disposed tightly close to a light conductor plate so that light emitted from the LED can be efficiently introduced into the light conductor plate. FIG. 4 shows a conventional spread illuminating apparatus incorporating the aforementioned approach, in which a light inlet surface LP of a light conductor plate GLB makes contact with the light emitting portions of LEDs 1 and 2, and inward curvatures PJ1 and PJ2 are formed at one side LW2 of a frame-like molded case MLD so as to protrude toward the LEDs 1 and 2 thereby resiliently generating forces (F) to press the light conductor plate GLB against the LEDs 1 and 2, which ensures a close contact between the LEDs 1 and 2 and the light inlet surface LP of the light conductor plate GLB thus allowing lights emitted from the LEDs 1 and 2 to be effectively introduced into the light conductor plate GLB.

Another approach is to increase the amount of light emitted from a primary light source by increasing the number of LEDs disposed at a side of a light conductor plate, or by increasing the current applied to an LED so as to increase the light amount per LED. This approach, however, causes an increase in heat generation at the primary light source thus raising the ambient temperature.

Generally, the luminous efficiency of an LED is lowered in proportion to an increase in temperature, and also in the case of the spread illuminating apparatus of FIG. 4 in which the LED and the light inlet surface of the light conductor plate are in contact with each other, heat generated at the LED is transmitted directly to the light inlet surface of the light conductor plate thus increasingly allowing the light inlet surface to suffer damages, such as thermal deformation.

Further, it is known that a side light type spread illuminating apparatus which has a plurality of LEDs disposed at a light inlet surface of a light conductor plate exhibits uneven brightness at a portion of the light conductor plate located close to the light inlet surface, such that there are bright areas positioned in front of the LEDs and dark areas each positioned between two adjacent LEDs. In order to overcome the uneven brightness problem, the side surface (light inlet surface) of the light conductor plate is, for example, provided with a prism array. If a prism array is formed at the light inlet surface LP of the light conductor plate GLB of the spread illuminating apparatus shown in FIG. 4, the heats from the LEDs 1 and 2 and the loads from the pressing forces (F) are concentrated at the apexes of prisms making contact with the LEDs 1 and 2, and consequently the aforementioned thermal deformation is caused more easily.

To deal with the heat generation problem with the LED, the LED and the light conductor plate are housed in a metallic chassis such that the LED makes contact with the chassis for enhancing the radiation performance (refer to, for example, Japanese Patent Application Laid-Open No. 2004-186004: Paragraphs [0035] to [0037] and FIG. 2 therein).

However, in the case of the spread illuminating apparatus of FIG. 4 in which the LED is disposed in contact with the light inlet surface of the light conductor plate, it is difficult to completely eliminate the heat deformation problem only by arranging the LED to make contact with the metallic chassis for enhancing the radiation performance as described above. Thus, as for the prevention of the thermal deformation, it is preferable for the LED not to make contact with the light conductor plate. On the other hand, when the LED is disposed at the light inlet surface of the light conductor plate with a certain air gap provided therebetween, the optical coupling efficiency between the LED and the light conductor plate is deteriorated thus lowering the brightness of the spread illuminating apparatus, and also the difficulty in precisely controlling the air gap distance causes variation in brightness and visual quality.

SUMMARY OF THE INVENTION

The present invention has been made in light of the above problems, and it is an object of the present invention to provide a spread illuminating apparatus in which a point light source is disposed at a light inlet surface of a light conductor plate such that a predetermined gap or clearance is provided and maintained consistent therebetween thereby stably retaining a good optical coupling between the point light source and the light conductor plate.

In order to achieve the object described above, according to an aspect of the present invention, a spread illuminating apparatus includes: a point light source; a light conductor plate having a prism array formed at a side surface thereof at which the point light source is disposed; and a frame to house the point light source and the light conductor plate. In the spread illuminating apparatus described above, the frame includes an elastically active area to urge the light conductor plate toward the point light source, and a heat-resistant transparent spacer is disposed between the point light source and the prism array of the light conductor plate.

Thanks to the elastically active area included in the frame and to the heat-resistant transparent spacer disposed between the point light source and the prism array of the light conductor plate, a high coupling efficiency between a point light source and a light conductor plate, which is an advantage coming from a direct contact between the point light source and the prism array, can be successfully achieved together with an effect in suppressing thermal deformation on the prism array, which is an advantage coming from provision of a gap between the point light source and the prism array.

The transparent spacer may be so heat resistant as not to be damaged, for example, deformed, by heat transferred from the point light source. Specifically, if the point light source is assumed to be heated up to about 130 degrees C., a transparent material which is continuously workable at a temperature of over 130 degrees may be used at least at an area disposed in contact with the point light source.

It may be preferable that the prism array be brought into contact with the transparent spacer with all the prism tops touching the surface of the transparent spacer in a uniform manner whereby the heat transferred from the point light source to the prism array and the load applied by the urging force of the elastically active area to the prism array are prevented from concentrating at particular individual prisms of the prism array, which suppresses the deformation of the prism array more effectively.

In the aspect of the present invention, the transparent spacer may include an elastic layer disposed in contact with the point light source, and a non-elastic layer disposed in contact with the prism array of the light conductor plate. With this structure, the coupling between the point light source and the light conductor plate can be stably maintained with application of a certain appropriate load, and at the same time the transparent spacer can be prevented from becoming deformed following the profile configuration of the prism array to such an extent as to destroy the light diffusing effect of the prism array.

The elastic layer may preferably be made of a light transmittable and heat resistant silicone. Heat resistant silicone is appropriately elastic and sufficiently heat resistant (typically, has a working temperature of 300 degrees C. or higher) and therefore is suitable as a material for the elastic layer of the transparent spacer. Also, the non-elastic layer may be made of polyethylene terephthalate (PET).

In the aspect of the present invention, the frame may include: an inner frame member which comprises a pair of side bars disposed opposite to each other and an end bar to connect respective one ends of the pair of side bars so as to form a substantially square U shape defining an open end; and an outer frame member which comprises a quadrangular plane and walls disposed to stand at the perimeter edges of the quadrangular plane and which houses the inner frame member, wherein the light conductor plate is disposed inside the inner frame member so as to sit on the quadrangular plane such that the side surface of the light conductor plate having the prism array is located toward the open end of the inner frame member, and wherein the point light source is sandwiched between the transparent spacer and one wall of the outer frame member.

With the structure described above, since the point light source is sandwiched between the transparent spacer and one wall of the outer frame member so as to make contact with the outer frame member directly (or via a circuit board on which the point light source is mounted), if the outer frame member is made of a material having a higher heat conductivity than the inner frame member material, then the heat from the point light source can be efficiently released from the outer frame member.

In the aspect of the present invention, the elastically active area may include a beam portion formed at the end bar of the inner frame member so as to extend parallel to the longitudinal direction of the end bar and a protruding portion disposed substantially at the center of the beam portion so as to protrude outwardly from the inner frame member, and inner frame member may be disposed inside the outer frame member such that the protruding portion makes contact with one wall of the outer frame member.

The elastically active area described above is located at the outward side of the side and end bars of the inner frame member so as to make contact with the outer frame member to thereby be elastically deformed. Accordingly, the inward side of the side and end bars of the inner frame member can be freely configured to the configuration of the side surfaces of the light conductor plate thus enabling lights leaking from the side surfaces to be efficiently re-introduced into the light conductor plate without causing brightness non-uniformity.

In the aspect of the present invention, the elastically active area may include a recess formed at each of the pair of side bars of the inner frame member and an elastic member disposed in the recess, a projection to be set in the recess may be formed at each of two side surfaces of the light conductor plate disposed opposite to each other and respectively facing the pair of side bars, and the light conductor plate may be housed inside the inner frame member such that a side face of the projection opposite to a side face thereof facing toward the point light source makes contact with the elastic member.

The elastically active area described above acts to urge the light conductor plate toward the point light source, and the light conductor plate is held inside the inner frame member such that the projection formed at each of the two opposite side surfaces of the light conductor plate respectively facing the pair of side bars of the inner frame member is coupled via the elastic member to the recess formed at each of the pair of side bars of the inner frame member. Consequently, the light conductor plate can be held inside the inner frame member with a necessary and appropriate clearance distance maintained therebetween in consideration of the extension and contraction balance between their materials due to the temperature and humidity changes.

In the aspect of the present invention, the elastically active area may include a recess formed at each of the pair of side bars of the inner frame member so as to have its bottom slanted with respect to the longitudinal direction of the side bar and a beam portion formed along the bottom of the recess by making a slit in the side bar, a projection to be set in the recess may be formed at each of two side surfaces of the light conductor plate disposed opposite to each other and respectively facing the pair of side bars, and the light conductor plate may be housed inside the inner frame member such that a portion of a side face of the projection opposite a side face thereof facing toward the point light source makes contact with the beam portion.

With the structure described above, the light conductor plate can be held, using bare necessary components, inside the inner frame member with a necessary and appropriate clearance distance maintained therebetween in consideration of the extension and contraction balance between the their materials due to the temperature and humidity changes.

In the aspect of the present invention, the outer frame member may be made of a metallic material. Generally, a metallic material is superior to a synthetic resin material in dimensional stability under the environmental changes, such as temperature and humidity changes, and therefore is suitable as a material for the outer frame member. Also, a metallic material has a high thermal conductivity, and the outer frame member made of a metallic material is advantageous in radiating the heat of the point light source.

In the spread illuminating apparatus according to the present invention, the optical coupling between the point light source and the light conductor plate can be well and stably maintained while the point light source is disposed so as to oppose the light inlet surface (the surface provided with the prism array) of the light conductor plate with a certain distance therebetween thus preventing thermal deformation on the prism array, which results in achieving a higher brightness and enhancing a brightness stability.

BRIEF DESCRIPTION OF THE DRAWING

FIG. 1 is a top plan view of a spread illuminating apparatus according to a first embodiment of the present invention;

FIG. 2 is a top plan view of a spread illuminating apparatus according to a second embodiment of the present invention;

DETAILED DESCRIPTION OF THE INVENTION

Figure 3:
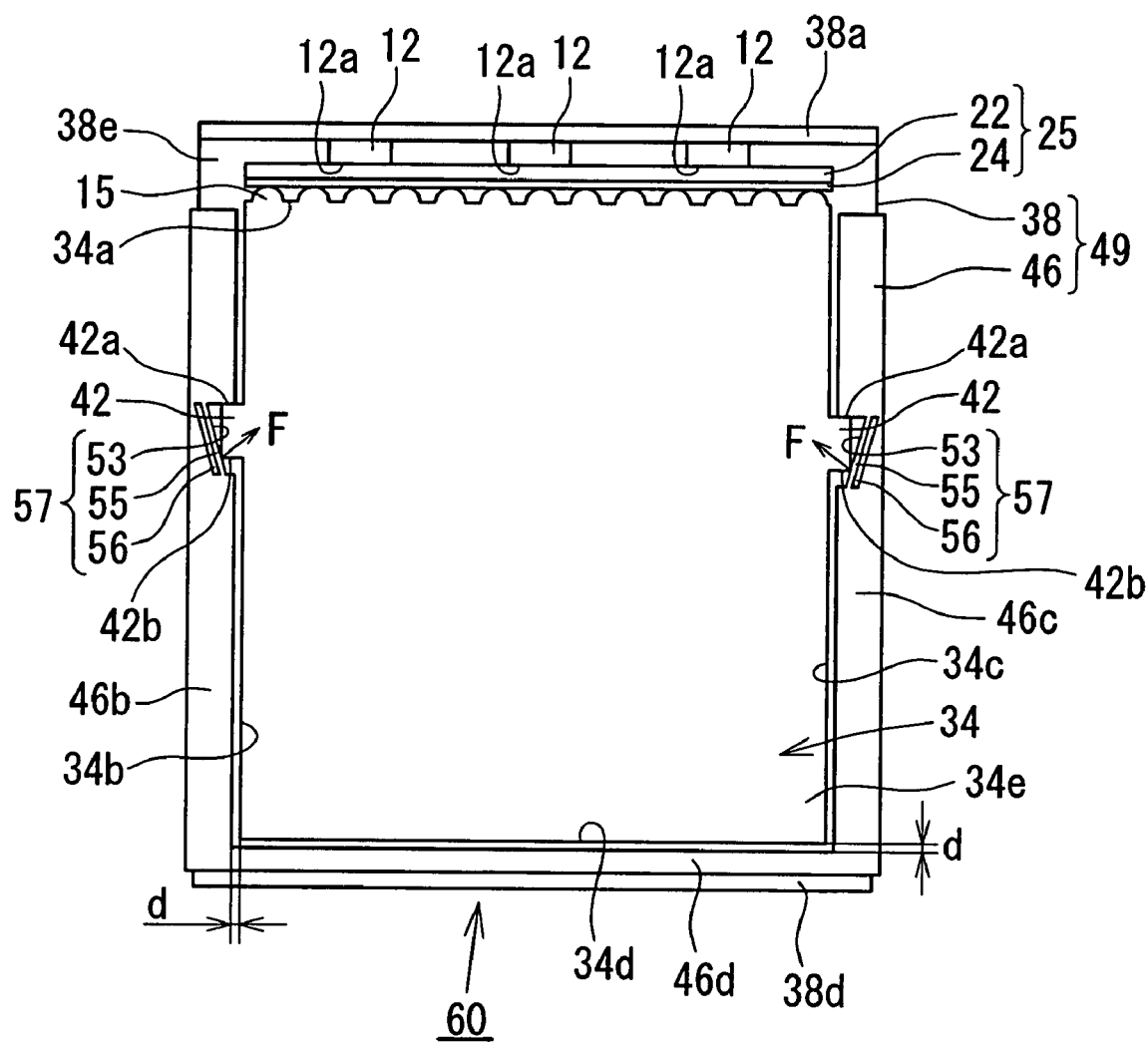
FIG. 3 is a top plan view of a spread illuminating apparatus according to a third embodiment of the present invention.
Figure 4:
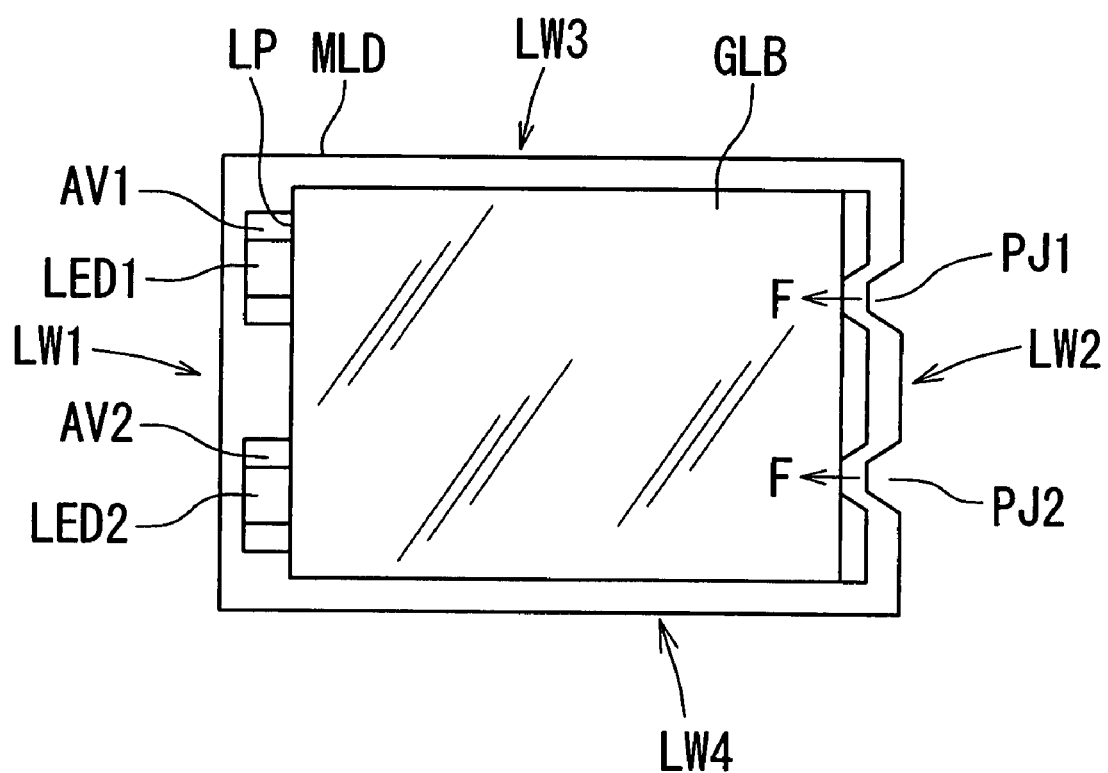
FIG. 4 is a schematic top plan view of a conventional spread illuminating apparatus.

Exemplary embodiments of the present invention will be described with reference to the accompanying drawings. It is noted that the drawings are for the purpose of explanation and do not necessarily reflect the actual configuration and dimension correctly.

A first embodiment of the present invention will be described with reference to FIG. 1. Referring to FIG. 1, a spread illuminating apparatus 10 according to the first embodiment includes a light conductor plate 14, point light sources 12 disposed at a side surface 14a of the light conductor plate 14, and a frame 19 to house the light conductor plate 14 and the point light sources 12. The frame 19 has a double structure composed of an inner frame member 16 and an outer frame member 18 to enclose the inner frame member 16.

The inner frame member 16 is made by molding white resin, for example, polycarbonate resin containing titanium oxide as a white pigment, and is formed in a substantially square U shape composed of a pair of side bars 16b and 16c disposed opposite to each other and an end bar 16d which is disposed so as to bridge respective one ends of the pair of side bars 16b and 16c thus constituting one end (lower in the figure) of the inner frame member 16 while no bar is provided at the other end (upper in the figure) of the inner frame member 16 thus defining an open end.

The outer frame member 18 is made of a highly heat conductive metal material, for example, aluminum, and is processed by press working or like methods so as to include a quadrangular plane 18e, and four walls (two end walls 18a and 18d, and two side walls 18b and 18c) standing at respective sides of the quadrangular plane 18e.

In the spread illuminating apparatus 10, the point light sources 12 each constituted typically by a white light emitting diode (LED) are arranged at one end wall 18a of the outer frame member 18. The present invention is not limited to any specific arrangement of the point light sources 12, but in the embodiment shown in FIG. 1, the point light sources 12 are each mounted on a circuit board (not shown) preferably constituted by a flexible printed circuit board, such that a face of the point light source 12 opposite to its light emitting face 12a is attached to the circuit board, and that the circuit board may be fixedly attached to the side wall 18a by a fixing means (not shown), such as a heat conductive adhesive tape. With this structure, the outer frame member 18, which is made of a metallic material, functions effectively also as a radiator of the heat generated at the point light sources 12.

The light conductor plate 14 is a rectangular plate member made of transparent resin, for example, acrylic resin, and polycarbonate resin. A prism array 15 is formed at a side surface (light inlet surface) 14a of the light conductor plate 14, and the light conductor plate 14 is placed in the inner frame member 16 so as to sit on the quadrangular plane 18e of the frame member 18 with the light inlet surface 14a being disposed at the open end of the inner frame member 16, whereby the light emitting faces 12a of the point light sources 12 oppose the prism array 15 of the light conductor plate 14.

The prism array 15 is composed of a plurality of partial circular cylinders extending in the thickness direction of the light conductor plate 14, which are continuously arranged entirely along the light inlet surface 14a such that the crowning tops (distal points) of the partial circular cylinders are positioned in a straight line.

In the first embodiment, the inner frame member 16 includes, at the end bar 16d, a pair of elastically active areas 30 which make contact with the end wall 18d of the outer frame member 18 and thereby are elastically deformed so as to press the inner frame member 16 (hence, the light conductor plate 14 housed in the frame member 16) toward the point light sources 12, and includes, at the side bar 16bz/16c, an elastically active area 30'/30' which is structured similarly to the elastically active area 30, and which makes contact with the side wall 18b/18c and thereby is elastically deformed.

The elastically active area 30 is composed of s beam portion 28 which is formed by making a slit 26 in the end bar 16d, extends along the length direction of the end bar 16d, and which is elastically deformable, and a protruding portion 29 which extends outwardly from the inner frame member 16. The protruding portion 29 of the elastically active area 30 makes contact with the end wall 18d of the outer frame member 18 and thereby causes the beam portion 28 to slightly bend toward the inside of the inner frame member 16, whereby a drag force ($F_U$) to act from the end wall 18d in the upward (in the figure) direction is generated as a counteraction of an elastic force which is acted by the elastically active area 30 onto the end wall 18d. The drag force ($F_U$) thus generated causes the inner frame member 16 and the light conductor plate 14 to be urged toward the point light sources 12.

The spread illuminating apparatus 10 further includes a transparent spacer 25 disposed between the point light sources 12 and the light conductor plate 14 such that one side surface of the transformer spacer 25 makes contact with the light emitting faces 12a of the point light sources 12 and the other side surface thereof makes contact with the prism array 15 of the light conductor plate 14, whereby the point light sources 12 are sandwiched between the end wall 18a of the outer frame member 18 and the transparent spacer 25 which, together with the light conductor plate 14, is urged toward the point light sources 12 by the action of the elastically active area 30.

The transparent spacer 25 is a laminate member composed of an elastic layer 22 made of a heat resistant silicone rubber sheet and a non-elastic layer made of polyethylene terephthalate (PET) sheet, wherein the elastic member 22 makes contact with the point light sources 2 so as to cover the light emitting faces 2a, and the non-elastic layer 24 makes contact with the prism array 15 formed entirely along the light inlet surface 14a of the light conductor plate 14. The elastic layer 22 preferably has a thickness of about 1 mm, and the non-elastic layer 24 preferably has a thickness of about 0.2 mm.

Since the prism array 25 is arranged, as described above, such that the crowning tops (distal points) of the partial circular cylinders are positioned in a straight line, the non-elastic layer 24 formed in a sheet configuration is adapted to make contact with all the crowning tops in a substantially uniform manner.

In the spread illuminating apparatus 10 structured as described above, lights emitted from the point light sources 12 go through the transparent spacer 25, are introduced into the light conductor plate 14 through the light inlet surface 14a, and exit the light conductor plate 14 through one major surface 14e thereof in a uniform manner while traveling inside the light conductor plate 14, wherein the light conductor plate 14 (hence, the transparent spacer 25) is urged toward the point light sources 12 by the action of the elastically active areas 30, whereby the point light sources 12 sandwiched between the transparent spacer 25 and the end wall 18a of the outer frame member 18 are well and stably coupled to the light conductor plate 14 and at the same time are brought into firm contact with the end wall 18a made of a heat conductive metal material thus enabling an efficient radiation performance.

Further, in the spread illuminating apparatus 10, since the transparent spacer 25 is disposed between the point light sources 12 and the prism array 15 of the light conductor plate 14, the heats generated at the point light sources 12 are prevented from conducting directly to the light conductor plate 14 thus suppressing the temperature rise of the prism array of the light conductor plate 14. Also, since the non-elastic layer 24 of the transparent spacer 25 makes contact with all of the crowning tops of the partial circular cylinders of the prism array 15 in a uniform manner, the heats generated at the point light sources 12 and conducted to the light conductor plate 14 via the transparent spacer 25 as well as the loads applied by the elastically active areas 30 to the light conductor plate 14 are prevented from concentrating at any specific individual prisms of the prism array 15 of the light conductor plate 114, and consequently a predetermined distance between the point light sources 12 and the prism array 15 can be readily maintained with a high precision while the prism array 15 is kept from undergoing thermal deformation.

In this connection, while the highest temperature commonly predicted when the point light source 12 emits light is about 130 degrees C., the elastic layer 22 of the transparent spacer 25, which is disposed in contact with the point light sources 12, is made of a light-transmittable heat-resistant silicone material (having a typical maximum operating temperature of about 300 degrees C. or higher), whereby the advantages described above can be duly achieved with no thermal damages given to the transparent spacer 25.

Also, since the transparent spacer 25 is made of light transmittable materials, lights emitted from the point light sources 12 can be efficiently conducted from the light emitting faces 12a to the prism array 15 of the light conductor plate 14 without leakage or loss.

In addition, since the vertical (in the figure) directional expansion and contraction of the light conductor plate 14 due to the change of ambient temperature and humidity is absorbed by the elastic deformation of the beam portion 28 of the elastically active area 30 and also by the elastic deformation of the elastic layer 22 of the transparent spacer 25, a substantially constant predetermined distance can be maintained between the light emitting faces 12a of the point light sources 12 and the prism array 15 of the light conductor plate 14 without applying an excessive load to the point light sources 12.

Further, the non-elastic layer 24 of the transparent spacer 25, which is made of a PET sheet, is disposed in contact with the prism array 15 of the light conductor plate 14, whereby the crowning tops of the prism array 15 do not wedge into the transparent spacer 25 thus allowing the prism array 15 to duly perform its function, which enables the spread illuminating apparatus 10 to achieve a uniform brightness.

In the present invention, a prism array formed at one side of a light conductor plate is not limited in configuration to the arrangement of the plurality of partial circular cylinders as shown in FIG. 1 but may be optimally configured such that the light inlet surface 14a of the light conductor plate 14 is partly or totally odd shaped in order to diffuse lights which are emitted from the point light sources 12 and introduced into the light conductor plate 14. The surface of the transparent spacer 25 making contact with the prism array, that is the outer surface of the non-elastic layer 24, may be appropriately configured in view of the configuration of the optimally configured prism array so as to achieve an even contact with the prism array.

The spread illuminating apparatus 10 shown in FIG. 1 includes, in addition to the elastically active area 30 formed at the end bar 16d of the inner frame member 16, two elastically active areas 30' structured similar to the elastically active area 30, formed respectively at the pair of side bars 16b and 16c of the inner frame member 16, and oriented along the length direction of the side bars 16b and 16c.

A drag force ($F_R$) to act from the end wall 18b in the rightward (in the figure) direction is generated as a counteraction of an elastic force acted by the elastically active area 30' onto the side wall 18b, and a drag force ($F_L$) to act from the end wall 18c in the leftward (in the figure) direction is generated as a counteraction of an elastic force acted by the elastically active area 30' onto the side wall 18c. With the drag forces ($F_R$) and ($F_L$), the inner frame member 16 can be stably held to the outer frame member 18.

Since the elastically active areas 30 and 30' are formed toward the outer sides of the end bar 16d and the side bar 16b/16c of the inner frame member 16, the inner sides of the end bar 16d and the side bar 16b/16c can be freely configured according to side surfaces 14d, 14b/14c of the light conductor plate 14. Thus, for example, if the light conductor plate 14 is placed in the inner frame member 16 with the surfaces 14b, 14c and 14d fitted close to the bars 16b, 16c and 16d, lights exiting out the light conductor plate 14 through the surfaces 14b, 14c and 14d are adapted to be efficiently reflected back into the light conductor plate 14 without causing non-uniformity of brightness.

Description will now be made on a second embodiment of the present invention with reference to FIG. 2. In explaining the second embodiment of FIG. 2, any component parts identical with or corresponding to those in FIG. 1 are denoted by the same reference numerals, and a redundant description thereof will be omitted below with a focus put on the difference from the first embodiment.

Referring to FIG. 2, a spread illuminating apparatus 40 according to the second embodiment includes point light sources 12, a light conductor plate 34, and a frame 39 to house the point light sources 12 and the light conductor plate 14. The frame 39 has a double structure composed of an inner frame member 36 and an outer frame member 38 to enclose the inner frame member 16, and includes elastically active areas 45 to urge the light conductor plate 14 toward the point light sources 12. A prism array 15 is formed at one side surface (light inlet surface) 34a of the light conductor plate 34, a transparent spacer 25 is disposed between the point light sources 12 and the prism array 15 of the light conductor plate 14, and the point light sources 12 are sandwiched between the transparent spacer 25 and an end wall 38a of the outer frame member 38.

In the spread illuminating apparatus 40 according to the second embodiment, the elastically active areas 45 to urge the light conductor plate 14 toward the point light sources 12 are each composed of a recess 44 formed at the inner side of a side bar 36b/36c, and an elastic member 43 placed in the recess 44.

A projection 42 to be set in the recess 44 of the elastically active area 45 is formed at each of side surfaces 34b and 34c of the light conductor plate 34 respectively opposing the side bars 36b and 36c of the inner frame member 36, and the light conductor plate 14 is placed in the inner frame member 16 with the projections 42 set in the recesses 44 such that a side face 42b of each projection 42 opposite to a side face 42a facing toward the point light sources 12 makes contact with the elastic member 43, whereby the light conductor plate 34 is urged toward the point light sources 12 by forces (F) coming from the elastic members 43.

With the structure described above, the spread illuminating apparatus 40 according to the second embodiment is adapted to achieve the same or similar advantages that the spread illuminating apparatus 10 of the first embodiment provides, and at the same time the advantage described below can be obtained by the fact that the elastically active areas 45 formed at the inner frame member 36, in conjunction with the projections 42 of the light conductor plate 34, function as a joint means for holding the light conductor plate 34 inside the inner frame member 36.

In the spread illuminating apparatus 40, the light conductor plate 34 can be held inside the inner frame member 36 in such a manner that a necessary and appropriate clearance distance (d), which is determined considering the extension and contraction balance settled according to the properties (linear expansion coefficient, etc.) of the materials of the light conductor plate 34 and the inner frame member 36 as well as according to the dimensions thereof in the extension and contraction direction, is secured between the three side surfaces 34b, 34c and 34d of the light conductor plate 34 and the three bars 36b, 36c and 36d, respectively.

The present inventor et al., based on their investigation, have verified that, for example, when the light conductor plate 34 and the inner frame member 36 are made of polycarbonate as a base material, and if the length of the light conductor plate 34 is set to 200 mm (this corresponds substantially to the longitudinal dimension of a light conductor plate for use in a spread illuminating apparatus for a 9 inch display screen), an open space of 0.363 mm provided at each side of the light conductive plate 34 is appropriate for the clearance distance (d) given for expansion for a temperature difference of 60 degrees C. in view of the expected amount of expansion due to the moisture absorption by the light conductor plate 34.

In this connection, an open space is provided between the side face 42b of the projection 42 and a face of the recess 44 opposing the side face 42b of the projection 42, and the thickness and the material (property) of the elastic member 43 of the elastically active area 45 are to be determined so as to securely maintain the dimension of the open space in which the elastic member 43 is fitted, and at the same time to absorb, by elastic deformation, the variation of the open space dimension caused by the expansion and contraction of the light conductor plate 34 and the inner frame member 36 to thereby keep applying an appropriate pressing force (F).

According to the investigation by the present inventor et al., it has been confirmed that, for example, when the elastic member 43 is made of a common rubber material with a hardness of 40, the thickness of the elastic member 43 is to be set to about 1.5 mm taking the assembly workability into consideration. A rubber material as described above is preferable for the elastic member 43 in terms of cost, but the elastic member 43 may alternatively be made of, for example, elastomer resin and a spring, insofar as the pressing force (F) is appropriately generated.

The spread illuminating apparatus 40 according to the second embodiment differs from the spread illuminating apparatus 10 according to the first embodiment also in that the outer frame member 38 has only two walls (end walls 38a and 38d disposed opposite to each other) and does not include two side walls corresponding to the sides walls 18b and 18c of the spread illuminating apparatus 10 shown in FIG. 1.

In connection with the difference in provision of wall on an outer frame member described above, the spread illuminating apparatus 10 of the first embodiment is suitable for stably holding the light conductor plate 14 and the inner frame member 16 inside the outer frame member 18 but has a relatively small tolerance for the expansion and contraction of the light conductor plate 14 and the inner frame member 16 caused by the ambient temperature and humidity changes, while the spread illuminating apparatus 40 of the second embodiment, in which the outer frame member 38 does not include side walls to cover respectively the side bars 36b and 36c of the inner frame member 36, allows an increased tolerance for such an expansion and contraction, in addition to securing the clearance distance (d) between the light conductor plate 34 and the inner frame member 36. It is to be noted, however, that in the spread illuminating apparatus 40, the outer frame member 38 may include side walls to cover the side bars 36b and 36c of the inner frame member 36, where necessary.

A third embodiment of the present invention will be described with reference to FIG. 3. In explaining the third embodiment of FIG. 3, any component parts identical with or corresponding to those in FIGS. 1 and 2 are denoted by the same reference numerals, and a redundant description thereof will be omitted below with a focus put on the difference from the first and second embodiments.

Referring to FIG. 3, a spread illuminating apparatus 60 according to the third embodiment is structured basically the same as the spread illuminating apparatus 40 of the second embodiment shown in FIG. 2 except that elastically active areas 57 are each composed of a recess 53 formed at each of a pair of side bars 46b and 46c of an inner frame member 46 so as to have its bottom face slanted with respect to the length direction of the side bar 46b/46c, and a beam portion 55 which is formed along the bottom face of the recess 53 by making a slit 56 in the side bar 46b/46c slanted with respect to the length direction of the side bar 46b/46c.

With the elastically active areas 57 structured as described above, a light conductor plate 34 is housed in the inner frame member 46 such that a projection 42 formed at each of a pair of side surfaces 34b and 34c of the light conductor plate 34 is set in the recess 53 in such a manner that a corner of the projection 42 formed by a face 42b thereof opposite to a face 42a facing toward point light sources 12 makes contact with the beam portion 55, wherein the light conductor plate 34 is urged toward the point light sources 12 by pressing forces (F) coming from the beam portions 55.

In the spread illuminating apparatus 60 according to the third embodiment, the elastically active area 57 is formed integrally in the inner frame member 46, whereby a necessary and appropriate clearance distance (d) is securely provided between the light conductor plate 34 and the inner frame member 46, while the light conductor plate 34 can be duly held in the inner frame member 46 with bare necessary components, specifically, eliminating the elastic member 43 which is used in the spread illuminating apparatus 40 shown in FIG. 2.

Also, since the beam portion 55 of the elastically active area 57 is slanted with respect to the length direction of the side bar 46b/46c of the inner frame member 46, the pressing force (F) coming from the beam portion 55 includes a component to urge the light conductor plate 34 in the direction orthogonal to the side bar 46b/46c (horizontal direction in the figure) a well as a component to urge the light conductor plate 34 toward the point light sources 12 (vertical direction in the figure). With the two components, the light conductor plate 34 can be stably held inside the inner frame member 46 with the aforementioned clearance distance (d) duly ensured therebetween. And, in the illuminating apparatus 60 of the third embodiment, an outer frame member 38 may include side walls located to cover the side bars of 46b and 46c of the inner frame member 46, where necessary.

The present invention is not limited in configuration to any of the exemplary embodiments described above. For example, in the spread illuminating apparatus 40/60 of FIGS. 2/3, an elastically active area which is discretely made of a rubber material, elastomer resin or spring, or which is formed integrally with the inner frame member 36/46 or the outer frame member 38 may be additionally provided between the rear end bar 36d/46d of the inner frame member 36/46 and the second end wall 38d of the outer frame member 38, whereby the inner frame member 36/46 can be more flexibly and stably coupled to the outer frame member 38.

What is claimed is:

1. A spread illuminating apparatus comprising:
    a point light source;
    a light conductor plate having a prism array formed at a side surface thereof at which the point light source is disposed;
    a frame to house the point light source and the light conductor plate, the frame including an elastically active area to urge the light conductor plate toward the point light source; and
    a heat-resistant transparent spacer disposed between the point light source and the prism array of the light conductor plate, the heat-resistant transparent spacer comprising an elastic layer disposed in contact with the point light source, and a non-elastic layer disposed in contact with the prism array of the light conductor plate.

2. A spread illuminating apparatus according to claim 1, wherein the elastic layer is made of heat resistant silicone.

3. A spread illuminating apparatus according to claim 1, wherein the non-elastic layer is made of polyethylene terephthalate.

4. A spread illuminating apparatus comprising:
    a point light source;
    a light conductor plate having a prism array formed at a side surface thereof at which the point light source is disposed;
    a frame to house the point light source and the light conductor plate, the frame including an elastically active area to urge the light conductor plate toward the point light source; and
    a heat-resistant transparent spacer disposed between the point light source and the prism array of the light conductor plate,
    wherein the frame comprises:
        an inner frame member which comprises a pair of side bars disposed opposite to each other and an end bar to connect respective one ends of the pair of side bars so as to form a substantially square U shape defining an open end; and
        an outer frame member which comprises a quadrangular plane and walls disposed to stand at perimeter edges of the quadrangular plane and which houses the inner frame member, wherein the light conductor plate is disposed inside the inner frame member so as to sit on the quadrangular plane such that the side surface of the light conductor plate having the prism array is located toward the open end of the inner frame member, and wherein the point light source is sandwiched between the transparent spacer and one wall of the outer frame member.

5. A spread illuminating apparatus according to claim 4, wherein the elastically active area comprises a beam portion formed at the end bar of the inner frame member so as to extend parallel to a longitudinal direction of the end bar, and a protruding portion disposed substantially at a center of the beam portion so as to protrude outwardly from the inner frame member, and wherein the inner frame member is disposed inside the outer frame member such that the protruding portion makes contact with one wall of the outer frame member.

6. A spread illuminating apparatus according to claim 4, wherein the elastically active area comprises a recess formed at each of the pair of side bars of the inner frame member, and an elastic member disposed in the recess, a projection to be set in the recess is formed at each of two side surfaces of the light conductor plate disposed opposite to each other and respectively facing the pair of side bars of the inner frame member, and wherein the light conductor plate is housed inside the inner frame member such that a side face of the projection opposite to a side face thereof facing toward the point light source makes contact with the elastic member.

7. A spread illuminating apparatus according to claim 4, wherein the elastically active area comprises a recess formed at each of the pair of side bars of the inner frame member so as to have its bottom slanted with respect to a longitudinal direction of the side bar, and a beam portion formed along the bottom of the recess by making a slit in the side bar, a projection to be set in the recess is formed at each of two side surfaces of the light conductor plate disposed opposite to each other and respectively facing the pair of side bars of the inner frame member, and wherein the light conductor plate is housed inside the inner frame member such that a portion of a side face of the projection opposite to a side face thereof facing toward the point light source makes contact with the beam portion.

8. A spread illuminating apparatus according to claim 4, wherein the outer frame member is made of a metallic material.

* * * * *